(12) United States Patent
Schaber et al.

(10) Patent No.: US 10,859,100 B2
(45) Date of Patent: Dec. 8, 2020

(54) HYDRAULIC DRIVE WITH FAST STROKE AND LOAD STROKE

(71) Applicant: Voith Patent GmbH, Heidenheim (DE)

(72) Inventors: Hubert Schaber, Rutesheim (DE); Magnus Junginger, Königsbronn (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/432,580

(22) Filed: Jun. 5, 2019

(65) Prior Publication Data

US 2019/0285094 A1  Sep. 19, 2019

Related U.S. Application Data

(63) Continuation of application No. PCT/EP2017/081434, filed on Dec. 5, 2017.

(30) Foreign Application Priority Data

Dec. 13, 2016  (DE) .................. 10 2016 124 118

(51) Int. Cl.
| | |
|---|---|
| *F15B 13/02* | (2006.01) |
| *F15B 11/02* | (2006.01) |
| *F16K 31/04* | (2006.01) |
| *F15B 11/024* | (2006.01) |
| *F15B 15/18* | (2006.01) |

(52) U.S. Cl.
CPC ............ *F15B 13/021* (2013.01); *F15B 11/02* (2013.01); *F15B 11/022* (2013.01);
(Continued)

(58) Field of Classification Search
CPC ........ F15B 11/022; F15B 11/02; F15B 15/18; F15B 2211/20561; F15B 2011/0243; F15B 2211/212
See application file for complete search history.

(56) References Cited

U.S. PATENT DOCUMENTS

| 4,833,971 A * | 5/1989 | Kubik ................... B30B 15/161 |
| | | 91/29 |
| 4,955,283 A * | 9/1990 | Hidaka ................. E02F 9/2203 |
| | | 91/447 |

(Continued)

FOREIGN PATENT DOCUMENTS

| DE | 2 102 869 | 8/1972 |
| DE | 37 07 354 A1 | 9/1988 |

(Continued)

OTHER PUBLICATIONS

International Search Report dated Mar. 9, 2018 for International Application No. PCT/EP2017/081434 (4 pages).

(Continued)

*Primary Examiner* — Thomas E Lazo

(74) *Attorney, Agent, or Firm* — Taylor IP, P.C.

(57) ABSTRACT

An autarkic hydraulic linear drive with a hydraulic arrangement and a method for operating the same. The hydraulic arrangement a pump unit, an equalizing reservoir, a load switching valve configured to switch between a fast extension and a load extension, and a hysteresis circuit. The hysteresis circuit is configured for triggering a first switching process of the load switching valve at a first control pressure and a second switching process of the load switching valve at a second control pressure that is different than the first control pressure.

16 Claims, 5 Drawing Sheets

(52) U.S. Cl.
CPC ........... *F16K 31/046* (2013.01); *F15B 11/024* (2013.01); *F15B 15/18* (2013.01); *F15B 2011/0243* (2013.01); *F15B 2211/20515* (2013.01); *F15B 2211/20561* (2013.01); *F15B 2211/212* (2013.01); *F15B 2211/27* (2013.01); *F15B 2211/6306* (2013.01); *F15B 2211/6309* (2013.01); *F15B 2211/6313* (2013.01); *F15B 2211/6336* (2013.01); *F15B 2211/6343* (2013.01); *F15B 2211/6355* (2013.01); *F15B 2211/67* (2013.01); *F15B 2211/8646* (2013.01)

(56) References Cited

U.S. PATENT DOCUMENTS

| | | | | |
|---|---|---|---|---|
| 6,253,658 | B1 * | 7/2001 | Kimura | E02F 9/226 91/447 |
| 6,742,438 | B2 * | 6/2004 | Kim | E02F 9/2203 91/445 |
| 8,966,891 | B2 * | 3/2015 | Opdenbosch | E02F 9/2228 60/461 |
| 9,003,951 | B2 * | 4/2015 | Sefcik | F15B 11/024 91/436 |

FOREIGN PATENT DOCUMENTS

| | | | |
|---|---|---|---|
| DE | 10 2014 016 296 A1 | 5/2016 | |
| EP | 1 580 437 A1 | 9/2005 | |
| EP | 1580437 A1 * | 9/2005 | .......... F15B 15/1466 |

OTHER PUBLICATIONS

German Office Action dated Sep. 6, 2017 for German Application No. 10 2016 124 118.0 (5 pages).

\* cited by examiner

HYDRAULIC DRIVE WITH FAST STROKE AND LOAD STROKE

CROSS REFERENCE TO RELATED APPLICATIONS

This is a continuation of PCT application No. PCT/EP2017/081434, entitled "HYDRAULIC DRIVE WITH FAST STROKE AND LOAD STROKE", filed Dec. 5, 2017, which is incorporated herein by reference.

BACKGROUND OF THE INVENTION

1. Field of the Invention

The present invention relates to a hydraulic drive with a fast stroke and a load stroke with a differential cylinder and a hydraulic arrangement for activation of a differential cylinder, as well as a method for control of a hydraulic drive with a differential cylinder in a fast stoke and a load stroke.

2. Description of the Related Art

A hydraulic arrangement for control of at least one differential cylinder which can be operated in a fast mode and load mode is known from DE 10 2014 016 296 A1. The hydraulic arrangement included a motor pump unit with a reversible pump and a reservoir. This hydraulic arrangement comprises a valve arrangement with an integrated switching arrangement and a switching valve. The switching valve can be switched automatically into a first and a second switching position. In a first switching position—fast stroke in direction of extension—hydraulic fluid flowing from the annular chamber via the switching valve and a fluid connection provided by the valve arrangement flows into the piston chamber of the differential cylinder without passing through the pump. Thus, only the differential volume between piston and annular chamber has to be moved into the piston chamber by the pump. In excess of a force acting in the direction of the extending position and thus in excess of a predefined pressure in the piston chamber, the switching valve switches automatically into a second switching position. The hydraulic fluid now flowing out of the annular chamber is now supplied to a reservoir. The hydraulic fluid moved by the pump is supplied to the piston chamber, resulting in a low piston speed at great force. If the pressure that is predefined for switching the switching device into the second switching position falls below the predefined level in the piston chamber, the switching arrangement is switched again automatically back into the first switching position.

This drive compensates the imbalance between the displacement volume of the pump and the difference between piston chamber and annular chamber by use of various valves. In addition, a corresponding fast stroke/load stroke characteristic can be produced.

The hydraulic cylinder which herein is used as a linear drive can—at reduced required pump capacity—be moved at increased speed. During load operation, the maximum possible driving speed is accordingly reduced. Compared to an arrangement without fast stroke/load stroke changeover, the pump size that is necessary for high speeds in fast stroke movement is reduced. Likewise, the maximum torque to generate maximum force in load stroke is reduced. The physical size of the pump as well as of the electric drive motor can thus be reduced on autarkic compact drives in a cost-saving and energy-saving manner. Because of the pronounced fast stroke/load stroke characteristic, the autarkic compact drive is especially suited for joining and embossing operations. The autarkic compact drive may also be suited for processes with similar properties, such as stamping and cutting.

Autarkic servo drives, for example CLDP by Voith and SHA by Rexroth, are known. These servo drives are linear drives with hydraulic transmission power. The drives are thus almost wear-resistant and have an unrestricted overload protection. Construction is compact and the integrated hydraulic system is self-contained. The servo drives have only a few electric interfaces. No hydraulic knowledge is necessary for assembly and start-up.

What is needed in the art is a cost-effective hydraulic arrangement for an autarkic linear drive.

SUMMARY OF THE INVENTION

The present invention provides a hydraulic arrangement for an autarkic linear drive such that the autarkic linear drive definitely ensures reliable operation in the fast mode and the load mode.

The hydraulic arrangement according to the present invention includes a load switching valve that is switched by way of a hysteresis circuit. This ensures that after a switching process a constant toggling between switching positions of the load switching valve is prevented. The switching valve preferably opens when a pressure on the side of the piston chamber exceeds a predefined pressure.

As a result of the load switching valve opening, a pressure drop may occur on the side of the annular chamber. Consequently, a pressure drop may also occur in the piston chamber, due to a movement of the piston. Without a hysteresis circuit, continuous switching could therefore occur between various switching positions. Provision of a hysteresis circuit can prevent this.

A further development provides that the hysteresis circuit includes at least one valve for provision of a control pressure to the load switching valve. The at least one valve of the hysteresis circuit is designed only for control volumes. Due to the design of the valves of the hysteresis circuit for only control volumes, the valves can be designed to be smaller since no volume flow passes through the valves. Control volumes are understood to be hydraulic flows that are not intended for supply of pressure at the actuator but are used only for control of switching positions of valves.

In one embodiment at least the plurality of valves utilized for control of a volume flow—preferably all valves of the hydraulic arrangement—are automatically switching valves. The expenditure of a control unit allocated to control of valve positions is thus not necessary. The autarkic system does not have to be provided with a multitude of power supplies for the control of the valves. Once a hydraulic system or linear drive that is designed and tailor made for predefined pressure conditions is placed into operation, such system is particularly robust. Use of valves having low throttling losses may be preferred in order to keep heat input in the hydraulic arrangement low. Because of the self-contained construction of the autarkic system it is advantageous if a cooling device can be foregone, or if a cooling capacity of a cooling system can be kept low.

One further development of the present invention provides inclusion of an equalizing reservoir that is designed for a maximum of 10 bar, preferably a maximum of 5 bar. With such a system, only a low preload pressure is required.

It may be advantageous to provide a pump which is reversible, and which has identical displacement volumes in both operating directions. It would of course also be possible to provide individual pumps for each pumping direction; however, a greater physical size would then be required. It would also be conceivable to provide two pumps with different displacement volumes. The identical displacement volumes into both pumping directions offer installation space advantages and cost benefits.

The hydraulic arrangement together with an actuator form an autarkic hydraulic linear drive. It turned out to be advantageous to provide a piston-cylinder unit in the embodiment of a differential cylinder as the actuator. On a differential cylinder the effective surfaces of the cylinder chambers are different sizes. At the same torque of the pump in both directions, it is possible to provide a greater effective force in one direction. Differential cylinders are moreover simple and cost effective in their structure.

Another further development of the autarkic linear drive provides a differential valve, wherein at least two hydraulic chambers of the piston-cylinder unit can be connected with one another via this differential valve. This may be especially advantageous for a fast movement, since then only one part of the hydraulic medium has to be moved by way of the pump into the pressure chamber—in particular the piston chamber—that is pressurized for the desired movement. Thus, the required pump volume can be reduced. In particular, a short circuit line between the annular chamber and the piston chamber of the differential cylinder can be short circuited by way of the differential valve which automatically closes on a shortfall of a predefined pressure difference between annular chamber and piston chamber. Thus, a load operation can then in particular be initiated.

One alternative embodiment provides for a controlled retraction so that the hydraulic arrangement has a hydraulic connection from the equalization reservoir to a pump connection allocated to the side of the annular chamber, and that at least one automatically opening valve is provided between equalizing reservoir and pump connection. Thus, it is possible to supply a part of the hydraulic volume moved by the pump to the equalizing reservoir. The pump delivers a predefined displacement volume, thereby limiting the speed of the movement of the piston-cylinder unit.

Another alternative embodiment provides that the hysteresis circuit of the load switching valve has a connection, for example a control line to the side of the piston chamber. It is thus possible to design the hysteresis circuit to automatically switch, subject to the current pressure on the side of the piston chamber. In another embodiment it is provided to utilize the current pressure on the side of the piston chamber and also that prevailing on the side of the annular chamber in the hysteresis circuit as control pressure for at least one switching operation.

Another further development of the present invention provides that the hysteresis circuit includes a hydraulic connection by way of which the hysteresis circuit is not supplied with any pressure if possible. This is achieved through a hydraulic connection to the equalizing reservoir.

One variation of the present invention provides, that the preload pressure is utilized in the hysteresis circuit to counteract the control pressure provided on part of the piston chamber.

In another embodiment it is provided that the hysteresis circuit has a first valve and a second valve, coupled preferably with the first valve. The first and second valve of the hysteresis circuit can also be arranged in a common housing.

A further aspect of the invention is, that a bypass valve is provided in a supply line to the equalizing reservoir. A hydraulic connection to the piston chamber or to pump connection can be established via said bypass valve. The bypass valve is in the embodiment of a directional control valve. In another embodiment, the directional control valve is designed as an automatically switching valve.

In addition, a pressure relief valve may be provided in the supply line to the equalizing reservoir from pump connection. By way of these valves it is possible to supply hydraulic medium from the side of the piston chamber and from the side of the annular chamber to the equalizing reservoir. Direct supply of hydraulic medium from the side of the piston chamber when retracting the piston may be especially advantageous, since then the hydraulic medium fed to the equalizing reservoir from the side of the piston chamber does not have to pass through the pump. On the other hand, a controlled pressure reduction on the side of the piston chamber maybe advantageous in some operating phases, since a controlled movement of the piston rod of the piston-cylinder unit is ensured.

The arrangement of the valves and the hydraulic connection to the equalizing reservoir, and the realized autonomous switching of the supply of hydraulic medium to the equalizing reservoir from the side of the annular chamber and also from the side of the piston chamber during the retraction movement of the piston rod represents an autonomous inventive aspect which can be used in particular independently of the hysteresis circuit.

One embodiment provides that, because of the hysteresis circuit, the load switching valve opens automatically if the pressure on the side of the piston chamber exceeds a predefined pressure.

Another embodiment provides that the hysteresis circuit is designed in such a way that the hysteresis circuit effects opening of the load switching valve during a first control pressure, and closing of the load switching valve occurs during a current second control pressure, wherein the first predefined control pressure has a ration relative to the second control pressure, and that this ratio is at least as great as a surface ratio of an effective piston surface of the piston chamber relative to an effective piston surface of the annular chamber. The hysteresis circuit is intended to provide the current control pressure at the load switching valve for automatic switching of the load switching valve.

The hydraulic arrangement uses standard components, resulting in a cost reduction.

With a hydraulic arrangement comprising exclusively automatically switching valves, the control expenditure is low. Such systems have a high functional reliability.

The present invention also provides a method to operate an autarkic hydraulic linear drive according to one of the preceding requirements, wherein for retracting, the hydraulic medium supplied to the annular chamber is fed to the annular chamber by way of the pump, wherein preferably during fast retraction the hydraulic medium passing by pump connection is supplied entirely to the annular chamber.

Another embodiment provides an operating mode which is described as load retraction. Load retraction is understood to be a controlled retraction under the influence of an outside counter force. To provide a controlled retraction in the case of load retraction, only a part of the hydraulic medium moved by the pump on the side of the annular chamber is fed to the annular chamber and a part is directed to the equalizing reservoir. Because of the predefined or maximum flow volume of the pump, the retraction movement is thus limited. Automatic switching may be provided in the event that a pressure falls below a predefined pressure on the side of the piston chamber during a fast retraction operating mode.

In another embodiment, an operating mode with fast extension is provided, wherein the hydraulic medium flowing out of the annular chamber is fed directly into the piston chamber via a short circuit line. The hydraulic medium being fed via the short circuit line into the piston chamber does not pass through the pump.

A decompression operating mode for pressure reduction on the side of the piston chamber is provided in another embodiment. The decompression mode is characterized in that the pump moves hydraulic medium on the side of the annular chamber and in that at least 80% of said flow volume of hydraulic medium, preferably at least 90% is supplied to the equalizing reservoir.

Another embodiment provides that the method provides at least 3, preferably at least 4 and especially preferably at least 5 different operating modes with automatic switching between them. Automatic switching is understood to be a changeover between different operating modes, wherein an electric signal to switch valves is not required.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplifications are not to be construed as limiting the scope of the invention in any manner.

DETAILED DESCRIPTION OF THE INVENTION

Figure 1:
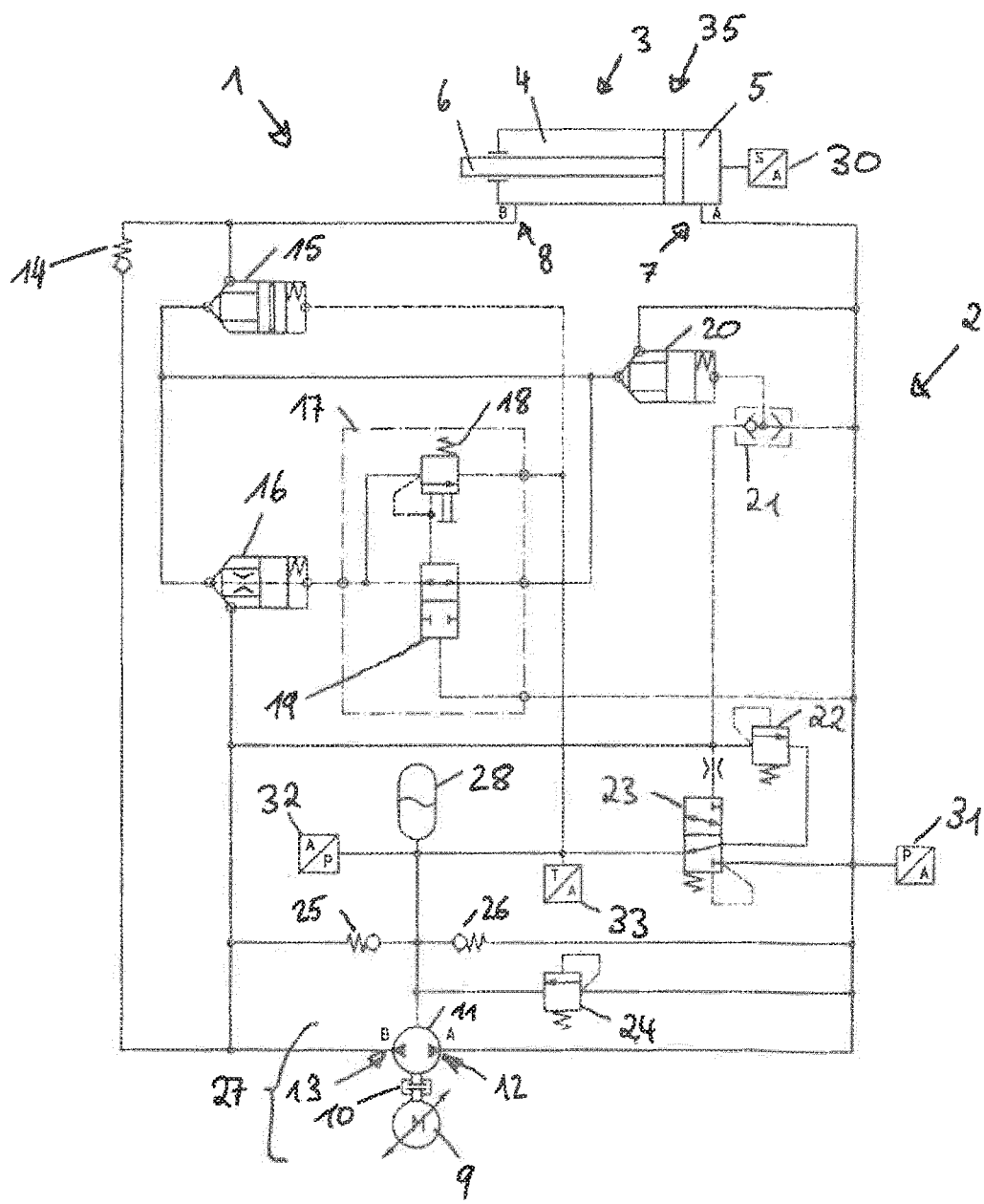
FIG. 1 is a schematic illustrating an autarkic linear drive, in a turned off operating state.

Referring now to the drawings, and more particularly to FIG. 1, there is shown one possible layout of an autarkic servo-hydraulic linear drive 1, also referred to as hydraulic linear drive 1. The linear drive 1 includes a piston-cylinder unit 3. The piston-cylinder unit 3 includes a cylinder in which a piston with a piston rod 6 is arranged which divides the cylinder volume into a piston chamber 5 and an annular chamber 4. By pressurizing piston chamber 5 and/or annular chamber 4, the piston with piston rod 6 can be moved. During movement of the piston, piston rod 6 describes a linear motion. A hydraulic arrangement 2 is provided for pressurization of piston-cylinder unit 3. Annular chamber 4 is connected with hydraulic arrangement 2 via a feed line B, 8 and piston chamber 5 is connected with hydraulic arrangement 2 via a feed line A, 7.

Hydraulic arrangement 2 has a pump unit 27 for pressurization. Pump unit 27 includes a reversible pump 11. In the illustrated example, pump 11 is connected via a coupling 10 with a drive in the embodiment of an electric motor 9. Pump 11 can be designed as a variable speed quadrant pump. The pump 11 can be operated in reverse mode and preferably has identical displacement volumes in both directions. Pump 11 is connected with a pump connection A, as identified by reference character 12 and with a pump connection B, as identified by reference character 13. Pump connections A, B of the pump 11 are connected with the supply lines A, B of piston-cylinder unit 3 via the hydraulic arrangement.

On the basis of displacement control, piston rod 6 of piston-cylinder unit 3 that is arranged as a differential cylinder, is moved. On a differential cylinder the surfaces of the piston separating annular chamber 4 from piston chamber 5 vary in size. A position or directional sensor 30 is allocated to piston-cylinder unit 3 for detection of piston movement.

Annular chamber 4 and piston chamber 5 can be connected with one another via a holding valve 15 and a differential valve 20. Piston chamber 5 is directly connected with pump connection A, 12 via supply line A, 7. In other words, there is no valve interposed.

A hydraulic connection between supply line B, 8 and pump connection B, 13 is provided, wherein a check valve 14 is provided in this connection. Moreover, a connection between the annular chamber 4 and pump connection B, 13 can be established via holding valve 15 and a load switching valve 16. A hysteresis circuit 17 is allocated to load switching valve 16. Hysteresis circuit 17 includes a pressure relief valve 18 and a directional valve 19. Both valves 18, 19 are designed only for the provision of a control pressure, but not for a volume flow.

A shuttle valve 21 is allocated to differential valve 20. For switching of differential valve 20, a connection with the supply line to piston chamber 5 or a connection to pump connection B, 13 can be established via shuttle valve 21.

Hydraulic arrangement 2 includes an equalizing reservoir 28. The equalizing reservoir 28 is connected with pump connection B, 13 via a check valve 25. A pressure sensor 32 for monitoring of the preload pressure is allocated to the equalizing reservoir 28. Equalizing reservoir 28 is designed for a pressure range of approximately 2 to a maximum of 10 bar. In addition, equalizing reservoir 28 is connected with the hydraulic connection of pump connection A, 12 and supply line A, 7 via a check valve 26. Check valve 25 opens at a lower pressure than check valve 26. The hydraulic medium in equalizing reservoir 28 can be accessed via check valves 25 and 26. A pressure relief valve 24 is provided in order to supply the hydraulic medium to equalizing reservoir 28 in the event of an overpressure on the piston side. Prevention of an overpressure on the side of annular chamber 4 or on the side of pump connection B, 13 is ensured by way of hysteresis circuit 17. Valve 16 opens at high pressure, and through the junction before differential valve 20, the hydraulic medium is supplied to the equalizing reservoir 28 via valves 19, 18.

Furthermore, a hydraulic connection to equalizing reservoir 28 is switchable from the side of piston chamber 5 by way of a bypass valve 23.

Moreover, a supply line to equalizing reservoir 28 can be provided on the side of annular chamber 4, which can be activated by a pressure relief valve 22 and which progresses via bypass valve 23 to equalizing reservoir 28. Switching between a connection to the side of piston chamber 5 or to the side of annular chamber 4 can be implemented by way of bypass valve 23.

A pressure sensor 31 is allocated to supply line A, 7 to piston chamber 5 for monitoring of the effective force. For monitoring the preload pressure, a pressure sensor 32 is allocated to equalizing reservoir 28. In addition, a temperature sensor 33 is provided in one supply line to the equalizing reservoir 28.

Autarkic linear drives are understood to be drives comprising a self-contained system.

The operating mode of this linear drive is described in more detail with reference to FIGS. 2 to 5.

Autarkic compact drive 1 illustrated in FIG. 1 can be operated in a position controlled manner by way of directional sensor 30 or in a pressure controlled manner by way of pressure sensor 31. The rotational speed, as well as the rotational direction of motor 9 has a direct influence on the movement of piston rod 6 of piston-cylinder unit 3. The rotational speed determines the speed, and a change in the rotational direction causes a reversal in direction of movement of piston rod 6.

Based on the displacement controlled mode of action, the system operates on the principle of a hydrostatic transmission. Accordingly designed valve technology of hydraulic arrangement 2 switches load-dependent automatically between two different transmission ratios. Switching of the valves of hydraulic arrangement 2 occurs automatically, depending on rotational direction and operating loads.

Bypass valve 23 and check valve 25 essentially have the task to compensate the imbalance between the displacement volume of pump 11 and the effective surfaces of annular chamber 4 and piston chamber 5. The surface ratio of the effective surfaces of piston chamber 5 relative to annular chamber 4 is typically a ratio in the range of 2. Load switching valve 16 and differential valve 20 are essentially responsible to switch the transmission ratio of the hydrostatic transmission. This makes a fast stroke-load stroke characteristic possible.

Linear drive 1 is a self-contained hydraulic system. To compensate for the differential volumes that result due to the piston-cylinder unit, an equalizing reservoir 28 is required.

The system is prestressed hydraulically with a preload pressure. In the shut-off state, holding valve 15 prevents drifting of the cylinder which is provoked by this preload pressure. The use of a poppet valve can completely prevent drifting. If drifting is permissible in the shut off state, holding valve 15 would not be required.

Position sensor 30 and pressure sensor 31 are used for directional- and pressure control, as well as for process monitoring. Depending on the application, a pressure sensor which is not illustrated here, can be provided on the side of annular chamber 4. Such a pressure sensor would permit clear detection as to which operating mode the system is in. The different operating modes are described below.

Operating Modes: "OFF"—Turned Off State:

The fact, that the system is hydraulically prestressed and that the cylinder has differential surfaces results in that the cylinder tends to extend in the turned off state. Holding valve 15 which is designed as a poppet valve prevents such drift behavior. The spring of holding valve 15 is dimensioned in such a way that a secure closing behavior is ensured with the dynamic pressure resulting from the system preload pressure and the cylinder surface ratio.

Figure 2:
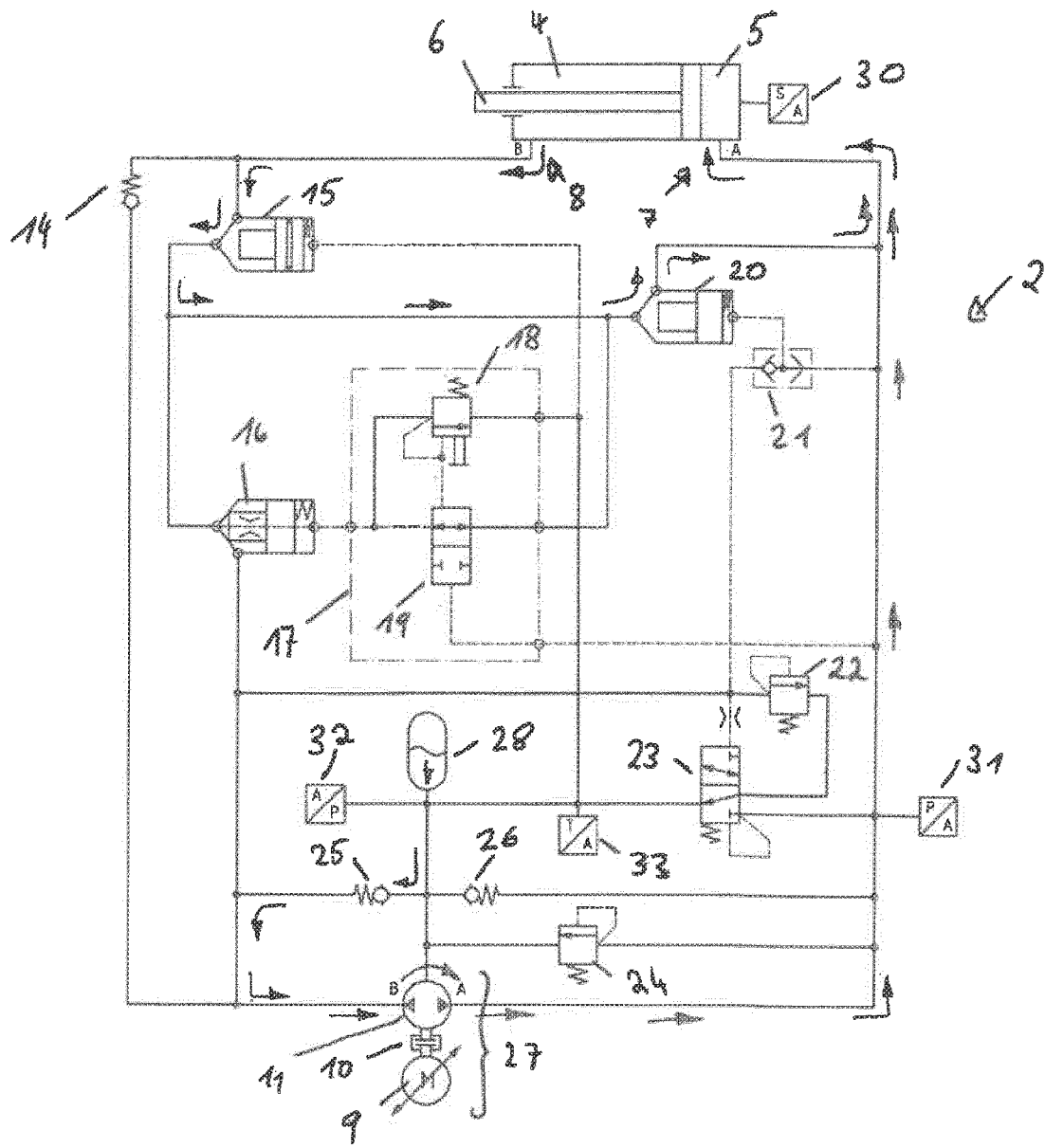
FIG. 2 is a schematic illustrating the linear drive in operating mode "fast extension"

Operating Modes "Fast Extension" According to FIG. 2:

Pump 11 moves hydraulic medium, preferably oil, at pump supply line A, 7 to the side of piston chamber 5 of the piston-cylinder unit. The hydraulic medium being displaced from annular chamber 4 is also guided into piston chamber 5 via holding valve 15 and differential valve 20. Piston-cylinder unit 3 thereby operates in the regenerative differential mode, thus achieving an increased travel speed of piston rod 6 relative to the flow volume of pump 11. The difference in surfaces AA-AB is effective. The speed in fast stroke results from:

$$V_{FAST} = Q/A_A - A_B$$

Surface $A_A$ is the surface of the piston on the side of piston chamber 5 and surface $A_B$ is the surface of the piston on the side of annular chamber 4. Q defines the flow volume of pump 11.

Holding valve 15 is opened by the dynamic pressure on the side of annular chamber 4 against an integrated pressure spring. A control line that is connected with holding valve 15 is connected with equalizing reservoir 28. Holding valve 15 is thus supplied with the preload pressure. Because of the control line, holding valve 15 opens already following a slight pressure increase on the side of annular chamber 4. Throttling losses are thereby reduced to a minimum, thus being able to keep energy consumption and heat input into the system low. In this phase, differential valve 20 fulfils the function of a check valve. On the suction side of pump 11, pump connection B, 13, pump 11 is supplied via check valve 25 with hydraulic medium from equalizing reservoir 28.

Figure 3:
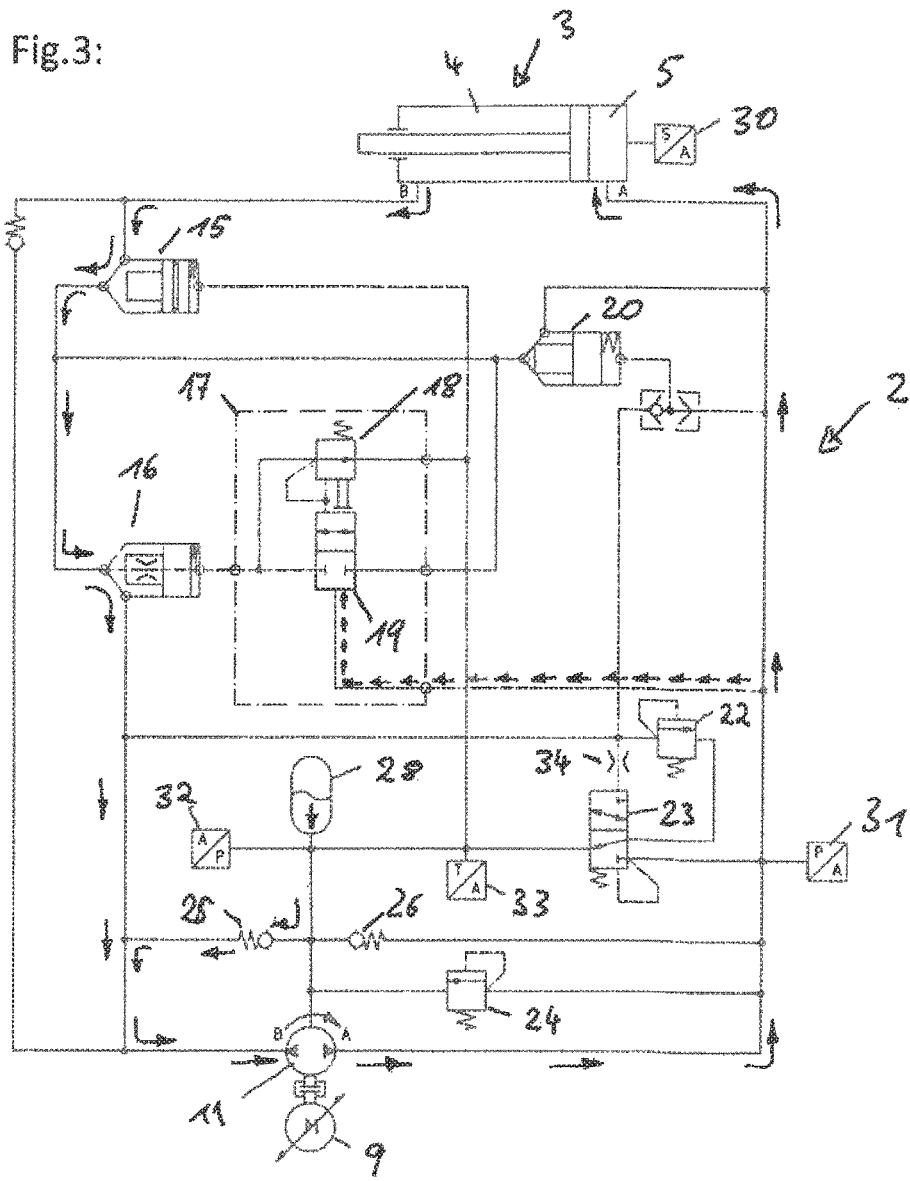
FIG. 3 is a schematic illustrating the linear drive in operating mode "load extension"

Operating Modes "Load Extension" According to FIG. 3:

If, during fast extension, the piston rod makes direct or indirect contact with an external load, the pressure increases in pressure chamber 5. Due to this increase in pressure, differential valve 20 closes. Differential valve 20 herein assumes the function of a check valve. Due to the increase in pressure on the side of piston chamber 5, directional valve 19 of hysteresis circuit 17 closes automatically. At the same time, pressure relief valve 18 of hysteresis circuit 17 opens. The system preload pressure of equalizing reservoir 28 now acts as control pressure on the load switching valve 16. Thus, load switching valve 16 is opened. After opening of load switching valve 16, the connection to the suction side, pump connection B, 13 is activated. Therefore, the pressure on the side of annular chamber 4 drops. As a result thereof, a pressure drop can also occur on the side of the piston chamber. Without a hysteresis circuit 17, the load switching valve 16 would now close again. These switching operations for automatic switching in a load mode occur automatically. In this load mode, linear drive 1, can generate its maximum power at reduced speed of piston rod 6. The speed of movement is calculated from the flow volume of pump 11 relative to the piston surface of piston-cylinder unit 3. The surface of the piston in piston chamber 5 is effective. In the load mode the speed results from $$V_{LOAD} = Q/A_A$$

Q defines the flow volume of pump 11 and AA is the surface of the piston in piston chamber 5.

Annular chamber 4 of piston-cylinder unit 3 is connected with the suction side of pump 11. Since the flow rate on the side of annular chamber 4 is less than the flow rate on the side of piston chamber 5 an appropriate differential volume is directed from equalizing reservoir 28, via check valve 25 to the suction side of the pump.

Detail for Switchover into the Load Mode:

When the control pressure reaches the specified pressure value at the hysteresis circuit of load switching valve 16, pressure relief valve 18 of hysteresis circuit 17 opens. Consequently, load switching valve 16 also switches, thus opening the connection to suction side of pump 11. Hysteresis circuit 17 is designed in such a way that it remains in the opened state and in addition has a reset hysteresis. The reset hysteresis is designed at least as large as the surface ratio at the piston of piston-cylinder unit 3, that is the surface on the piston of piston chamber 5 relative to that on the piston of annular chamber 4. For example, the design may be for an opening pressure of 60 bar and a reset pressure of 20 bar. If the switch on/switch off ratio is selected smaller than the cylinder surface ratio, load switching valve 16 cannot assume a clear position wherein an oscillation of load switching valve 16 could occur. In the illustrated embodiment, load switching valve 16 is equipped with an aperture. The function of the aperture is to limit the control volume flow.

Operating Modes "Decompression":

After completion of the specified process, for example joining, embossing, stamping or cutting, a decompression is provided. During decompression, the active compression volume on the side of piston chamber 5, as well as stored preload pressure in the machine stand—in other words in the machine parts which have an operative connection with the linear drive 1—is being relieved. Essentially no, or only a very insignificant relative movement of piston rod 6 occurs. By changing the rotational direction of pump 11, the pressure in the compressed hydraulic medium on the side of piston chamber 5 is relieved via pump connection A, 12 of pump 11. The hydraulic medium flowing from pump 11 is directed into equalizing reservoir 28 via pressure relief valve 22 and bypass valve 23.

Figure 4:
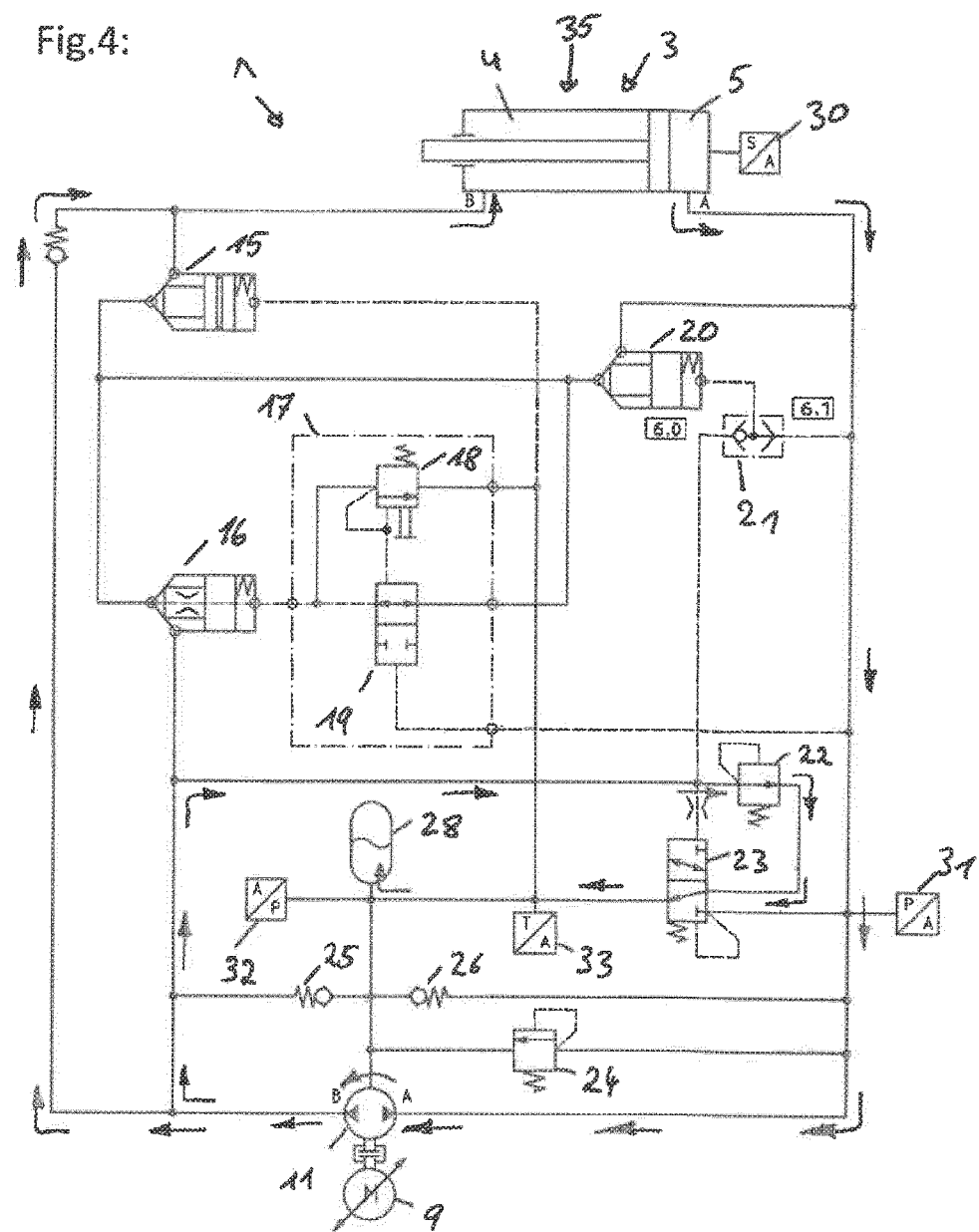
FIG. 4 is a schematic illustrating the linear drive in operating mode "load retraction"

Operating Modes "Load Retraction at External Counter Force" According to FIG. 4:

Directly following decompression is the retraction with external counter force. An external counter force can occur for example through an external tooling system with springs, for example hold-down device or strippers. In this state, the piston rod 6 is retracted at maximum load speed until the counterforce has dropped to a specified force level. This force level can be adjusted via pressure relief valve 22. The force level can be adjusted independent of the design of hysteresis circuit 17. Effective surfaces and speeds of the load stroke apply.

The volume of hydraulic medium is taken up by pump 11 on the side of piston chamber 5; the hydraulic medium flowing off via pump connection B, 13 is directed into annular chamber 4 via check valve 14. Since the increase in volume in annular chamber 4 per traveled distance of the piston is less than the reduction of volume in piston chamber 5, a differential volume is guided into equalizing reservoir 28 via pressure relief valve 22 and via bypass valve 23. In this operating mode, bypass valve 23 must remain forcibly closed, since opening of said bypass valve 23 would result in an uncontrolled retraction move of piston rod 6. The unintended opening of bypass valve 23 is prevented if the pressure acting upon the control surface of bypass valve 23 on the side of annular chamber 4 is lower than the control pressure acting from the side of the piston chamber onto valve 23. Aperture 34 is provided for damping of the switching behavior. Thus, bypass valve 23 opens only when the pressure on the side of piston chamber 5, inclusive of the spring force of bypass valve 23, falls below the opening pressure of pressure relief valve 22.

Figure 5:
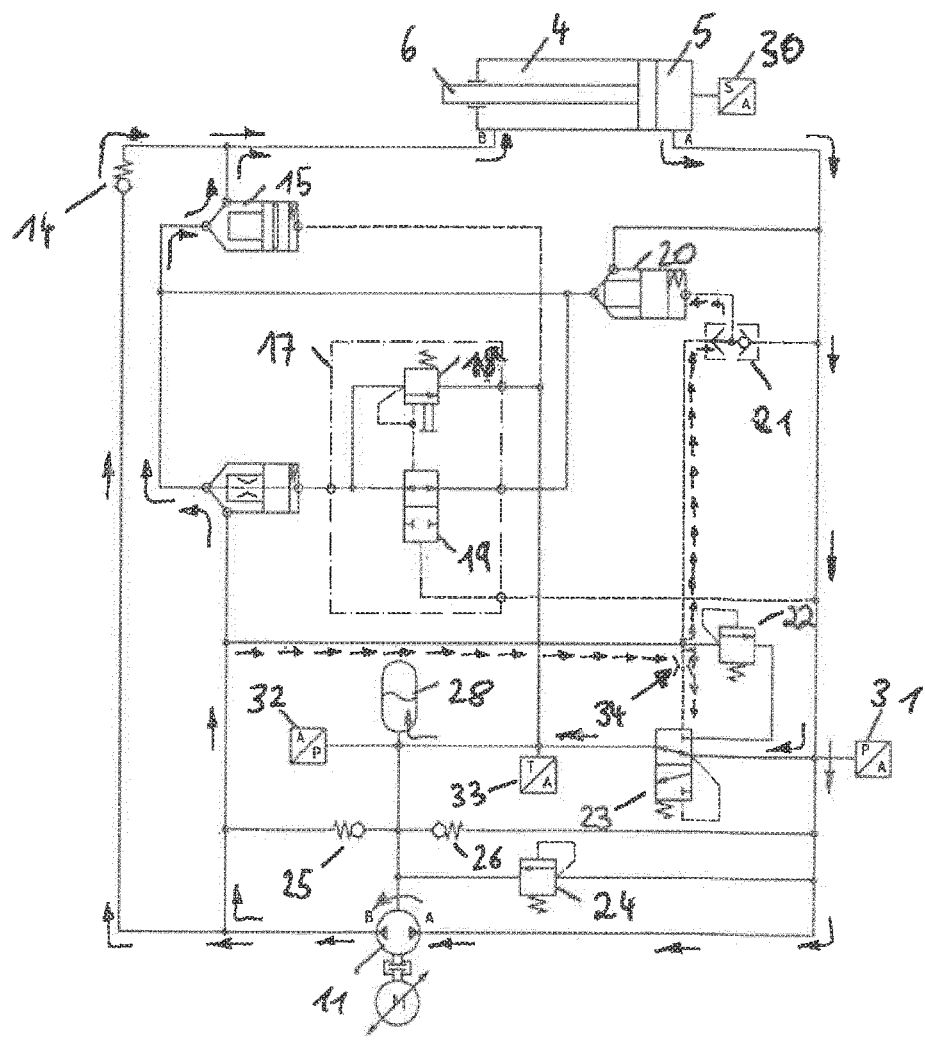
FIG. 5 is a schematic illustrating the linear drive in operating mode "fast retraction".

Operating Modes "Fast Retraction" According to FIG. 5:

Directly following "load retraction" is "fast retraction". On switching bypass valve 23, the connection between pressure relief valve 22 and equalizing reservoir 28 is interrupted and the function of pressure relief valve 22 is blocked. Simultaneously, a bypass connection between the piston chamber 5 of the cylinder to the equalizing reservoir 28 is opened by switching bypass valve 23. In this operational state, part of the pump volume is directed into annular chamber 4 via load switching valve 16 in its function as a check valve as well as via holding valve 15. A partial volume flows parallel thereto via check valve 14. Differential valve 20 is closed in this phase, since the control pressure acts via shuttle valve 21 from the side of annular chamber 4 upon the relevant control surface of the differential valve 20. Surface AB, that is the surface of the piston, is effective on annular chamber side 4. The speed in the fast mode (retraction) results from:

$$V_{FAST} = Q/A_B$$

The volume flow flowing out of the cylinder piston side is partially taken up by the pump; the remaining volume flows via bypass valve 23 which is switched to the "bypass" position into equalizing reservoir 28. Piston rod 6 is thereby moved at an accordingly high fast speed. During retraction a high pressure exceeding the preload pressure can be built up on the side of the annular chamber 4, since the supply line to the equalizing reservoir 28 is blocked by bypass valve 23 from the side of annular chamber 4.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LISTING 1 autarkic servo-hydraulic linear drive
2 hydraulic arrangement
3 piston-cylinder unit
4 annular chamber
5 piston chamber
6 piston rod
7 supply line to piston chamber, supply line A
8 supply line to annular chamber, supply line B
9 motor (synchronous motor, servo motor)
10 coupling
11 pump, reversible, variable speed
12 pump connection A
13 pump connection B
14 check valve between pump and annular chamber
15 holding valve
16 load switching valve—main stage
17 hysteresis circuit load switching valve
18 pressure relief valve of hysteresis circuit
19 directional valve of hysteresis circuit
20 differential valve
21 shuttle valve
22 pressure relief valve in supply line to equalizing reservoir from annular chamber
23 bypass valve of equalizing reservoir supply line from annular chamber
24 relief valve in equalizing reservoir supply line from piston chamber
25 check valve between equalizing reservoir and annular chamber
26 check valve between equalizing reservoir and piston chamber
27 pump unit
28 equalizing reservoir
30 directional sensor, position sensor 31 process monitoring compression force, pressure sensor—compression force
32 monitoring of preload pressure, pressure sensor—preload pressure
33 temperature sensor
34 aperture
35 differential cylinder

What is claimed is:

1. A hydraulic arrangement for an autarkic hydraulic linear drive, comprising:
    a pump unit;
    an equalizing reservoir;
    an automatically switching load switching valve configured to switch between a fast extension and a load extension; and
    a hysteresis circuit assigned to the load switching valve, the hysteresis circuit including a relief valve and a directional valve coupled with the relief valve, the relief valve and the directional valve being only for control volumes, the hysteresis circuit being configured for triggering a first switching process of the load switching valve at a first control pressure and a second switching process of the load switching valve at a second control pressure that is different than the first control pressure.

2. The hydraulic arrangement according to claim 1, further including a pump connection, wherein the hysteresis circuit protects the pump connection against an overpressure load.

3. The hydraulic arrangement according to claim 1, wherein all valves of the hydraulic arrangement are automatically switching valves.

4. The hydraulic arrangement according to claim 1, wherein the equalizing reservoir is configured for a pressure range of 10 bar maximum.

5. The hydraulic arrangement according to claim 1, wherein the pump unit includes a pump that is operable in two operating directions and has identical displacement volumes in both operating directions.

6. An autarkic hydraulic linear drive, comprising:
    a hydraulic arrangement, comprising:
        a pump unit;
        an equalizing reservoir;
        an automatically switching load switching valve configured to switch between a fast extension and a load extension; and
        a hysteresis circuit assigned to the load switching valve, the hysteresis circuit including a first valve and a second valve coupled with the first valve, the hysteresis circuit being configured for triggering a first switching process of the load switching valve at a first control pressure and a second switching process of the load switching valve at a second control pressure that is different than the first control pressure; and
    a piston-cylinder unit having a first cylinder chamber in the form of an annular chamber and a second cylinder chamber in the form of a piston chamber.

7. The autarkic hydraulic linear drive according to claim 6, wherein a differential cylinder is provided as the piston-cylinder unit.

8. The autarkic hydraulic linear drive according to claim 6, wherein the hydraulic arrangement includes a differential valve, and the differential valve is configured for connecting the annular chamber and the piston chamber with one another for the fast extension.

9. The autarkic hydraulic linear drive according to claim 6, wherein the hydraulic arrangement has a hydraulic connection from the equalizing reservoir to a pump connection that is allocated to a side of the annular chamber, and an automatically opening check valve is provided in between the equalizing reservoir and the pump connection.

10. The autarkic hydraulic linear drive according to claim 6, wherein the hysteresis circuit is connected to a side of the piston chamber by a control line.

11. The autarkic hydraulic linear drive according to claim 6, wherein the hysteresis circuit has a hydraulic connection to the equalizing reservoir.

12. The autarkic hydraulic linear drive according to claim 6, further including a bypass valve in a supply line to the equalizing reservoir for establishing a hydraulic connection to the piston chamber.

13. The autarkic hydraulic linear drive according to claim 12, further including a pressure relief valve in the supply line to the equalizing reservoir from a pump connection.

14. The autarkic hydraulic linear drive according to claim 6, wherein due to the hysteresis circuit, the load switching valve opens automatically if a pressure on a side of piston chamber exceeds a predefined pressure.

15. A method for operating an autarkic hydraulic linear drive, comprising:
    providing a hydraulic arrangement for the autarkic hydraulic linear drive, the hydraulic arrangement including a pump unit with a pump, an equalizing reservoir, an automatically switching load switching valve configured to switch between a fast extension and a load extension, and a hysteresis circuit assigned to the load switching valve, the hysteresis circuit including a relief valve and a directional valve coupled with the relief valve, the hysteresis circuit being configured for triggering a first switching process of the load switching valve at a first control pressure and a second switching process of the load switching valve at a second control pressure that is different than the first control pressure, and a piston-cylinder unit for the autarkic hydraulic linear drive including an annular chamber and a piston chamber; and
    feeding a hydraulic medium to the annular chamber, by the pump, for retracting, and wherein during fast retraction the hydraulic medium, passing by a pump connection, is entirely supplied to the annular chamber.

16. The method according to claim 15, wherein the hydraulic arrangement includes a differential valve, and the differential valve is configured for connecting the annular chamber and the piston chamber with one another for the fast extension.

* * * * *